BASIC TIME SWITCH CIRCUIT

BASIC DRUM PULSING ARRANGEMENT

United States Patent Office 3,496,375
Patented Feb. 17, 1970

3,496,375
CONTROL EQUIPMENT FOR CONTROLLING THE SEQUENCE AND DURATION OF DIFFERENT FUNCTIONS
Frederic Charles Lamb, London, and Bernard Albert Bentley, Camberley, England, assignors to Essoldomatic Ltd., London, England
Filed Feb. 23, 1967, Ser. No. 618,002
Int. Cl. H01h 43/00
U.S. Cl. 307—141         11 Claims

ABSTRACT OF THE DISCLOSURE

The durations of the states of a plurality of latching relays associated with different functions, respectively, are controlled in predetermined sequence by switching operations successively performed by a time clock. A multiposition stepping relay is operated by those switching operations with each of its positions causing energisation of at least one of the latching relay coils. One latching relay actuates a control drum unit having rows of switch actuating pegs with the drum being stepped from row to row of pegs by pulses not derived externally of the time clock. Means are provided for substituting a second time clock and associated control drum unit in predetermined sequence.

---

Figure 1:
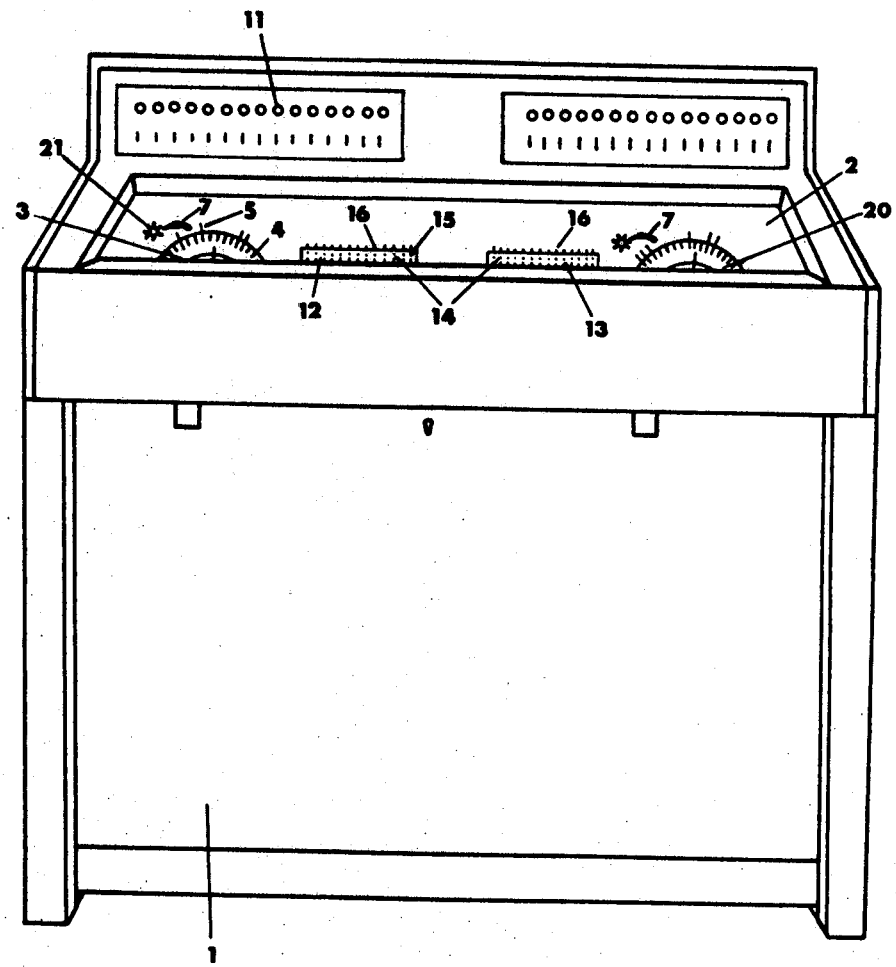

This invention concerns control equipment and has particular but not exclusive reference to control equipment which can carry out a long sequence of switching operations in the correct order and at predetermined times. Such control equipment is particularly suitable for controlling the operation of a cinema as it is necessary for a large number of separate functions to be performed daily in the cinema's normal operation. For example it is necessary, amongst a large number of other tasks, to switch on the cinema's outside lighting, switch on the ventilation, warn the staff and operate and control the film projectors. These operations normally involve the use of several staff and it is an object of the present invention to provide control equipment which can be used to reduce the number of staff necessary to control the operation of an establishment such as a cinema or a hotel.

According to the present invention, control equipment comprises a time clock for performing a predetermined sequence of switching operations, relay means responsive to the time clock and controlling the operation of a plurality of switching relays each of which is associated with an individual switching circuit.

The relay means may be a multiposition step relay and the switching relays may be mechanical latching relays. The step relay may be connected to both the "ON" and "OFF" coils of the mechanical relays.

The time clock may comprise a dial rotated by a synchronous motor, the dial having a number of projections each adapted to engage a microswitch, so as to operate the microswitch in a sequence determined by the spacing of the projection on the dial. The position of the projections on the dial may be adjustable and the projections may comprise vanes which can be located in slots formed in the periphery of the dial.

The control equipment may include a control unit which can be brought into operation by switching relays controlled by the relay means but which can operate to perform a sequence of switching functions in response to a sequence of demand impulses which are not derived from the time clock. The control unit may consist of at least one drum, means for rotating the drum stepwise, and means on the drum for actuating at least one microswitch upon rotation of the drum.

The surface of the drum may be perforated, each perforation being capable of receiving a pin so that the head of the pin can project beyond the surface of the drum; the or each pin so mounted in the drum surface being adapted to operate a microswitch, so that the switching functions controlled by the drum are dependent upon the arrangement of the pins in the surface of the drum.

The control equipment may include a second time clock which can be programmed to perform a series of switching operations in a schedule which is different from the first time clock and also may include stop means for rendering one of the time clocks ineffective and bringing the other time clock into operation in a predetermined sequence. The stop means may comprise a pair of rotary members one being assorted with each time clock and means for synchronously rotating the rotary members, each rotary member being arranged to inhibit the switching functions of its associated time clock when it is in a predetermined angular position.

Each rotary member may be a multilobe rotor, each lobe being capable of carrying a projection which will engage the switch operated by the time clock associated with the rotor so as to prevent operation of the switch. Each lobe may have an aperture which can receive a pin, the pin providing the projection for engaging the associated switch.

Each switch circuit controlled by the control equipment may include a manual override switch, so that the individual switch circuits can be controlled manually.

The or each time clock may be programmed to control the operation of a cinema, the control unit being adapted to be operated by command impulses derived from one or more cinematographic film projectors.

Figure 2:
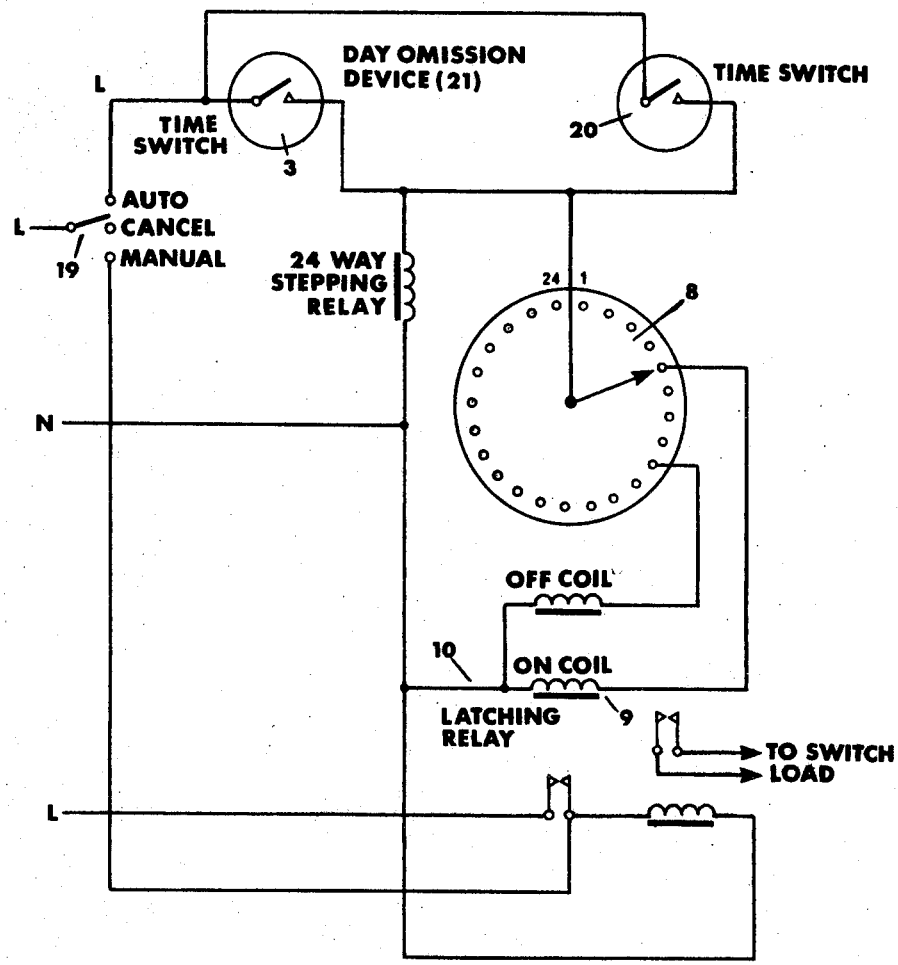
Figure 3:
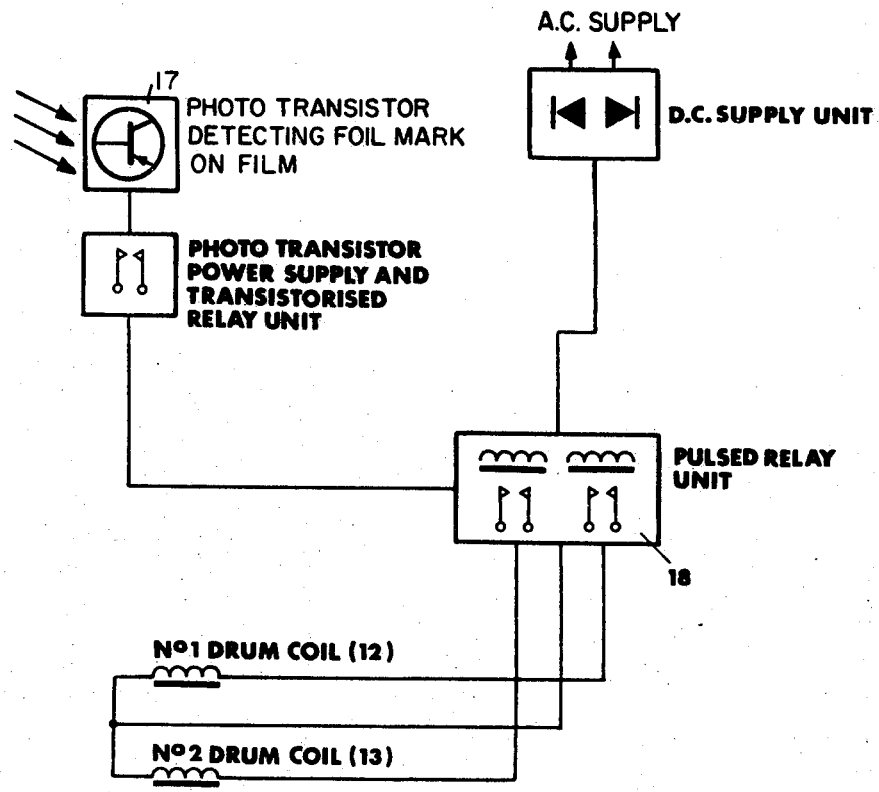
Figure 3:
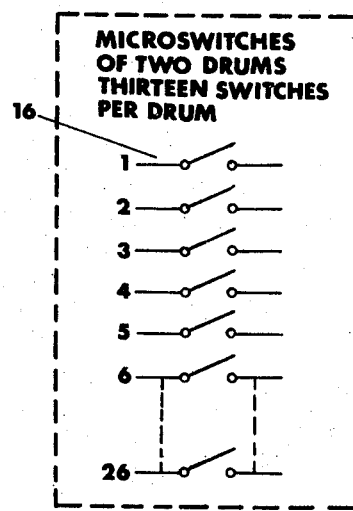
Figure 4:
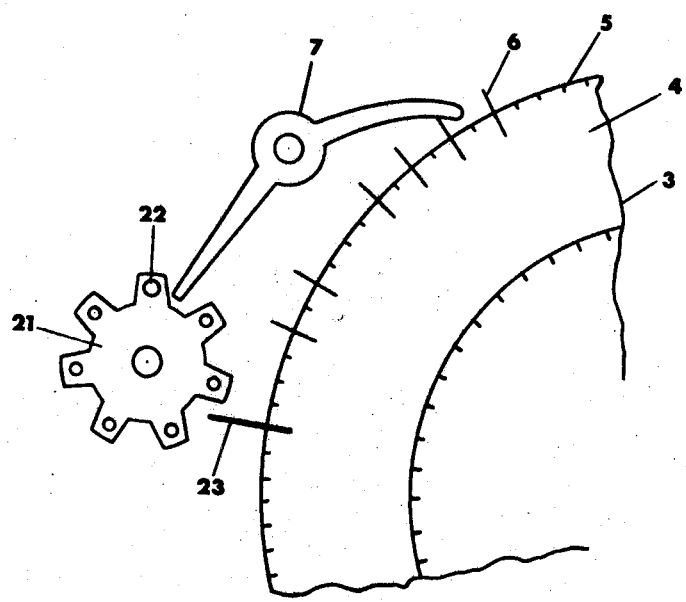

One embodiment of control equipment constructed in accordance with the present invention and for controlling the operation of a cinema having two film projectors, will now be particularly described herein and after by way of example and with reference to the accompanying drawings in which:

FIGURE 1 is a perspective view of a console;
FIGURE 2 is a circuit diagram showing one switching circuit of the control console of FIGURE 1;
FIGURE 3 is a circuit diagram showing a second switching circuit of the control console of FIGURE 1; and
FIGURE 4 is a detail view of part of the control panel of the control console of FIGURE 1.

The control console shown in the accompanying drawings comprises a main cabinet 1 having a control panel 2. Located within the cabinet are two control units which are virtually independent of one another. The first control unit will be referred to as the theatre time sequence control unit, and the basic circuit of which is shown in FIGURE 2, and the other control unit as the master drum unit, the basic circuit of which is shown in FIGURE 3. The first of these two units controls the functions of the cinema which are divorced from the actual presentation of films and which follow a rigid time schedule, whilst the master drum unit is actually controlled by the film program, and is only linked to the theatre time sequence control unit by the fact that it is brought into and out of operation by the latter, but otherwise it functions independently.

The theatre time sequence control unit comprises a main time clock 3 mounted on the control panel 2 and which consists of a circular dial 4 which is rotated once every 24 hours by a synchronous motor (not shown) driven from the mains. The rim of the dial 4 is slotted at regular intervals, the space between each slot 5 corresponding to a five minute time interval. Each slot 5 can receive a vane 6 which projects beyond the periphery of the dial 4 so that as the dial 4 rotates the vanes 6 on it are brought successively past a microswitch 7 so as to trip the switch 7 in a sequence depending upon the spacing of the vanes 6 on the dial 4. As the switch 7 is tripped it operates a step relay 8. The step relay 8 has two banks connected in parallel, each bank having 24 separate positions. Each position of the step relay 8 is connected to the "On" coil 9 of a mechanically latching relay 10. Thus as the switch 7 is tripped by a vane 6 it operates the step relay 8 which in turn operates one of the mechanical latching relays 10. Thus each of the mechanical latching relays 10 is brought into action in turn in a sequence depending upon the arrangement of the vanes 6 on the dial 4.

The control panel 2 also carries a number of indicator lights generally indicated at 11, these lights corresponding to the switching functions set out hereinafter.

In the cinema the mechanical latching relay 10 controls the switch circuits which perform the following functions in the cinema.

(1) Energise a contact to switch on the Control Equipment.

(2) Switch on the Cleaners Lights, also small power main/s to provide such lighting as may be required during the morning.

(2A) Switch off the cinema Night Lights.

(3) Switch on extractor fans, also illuminate an "Extract Fans ON" indicator on the control console.

(3A) Switch on circulation Pump, and also illuminate a "Circulation Pump ON" indicator on the control console.

(4) Switch on Plenum Fan motor, and illuminate a "Plenum Fan ON" indicator on the control console.

(5) Switch on sound and projector mains, also illuminate a "Check picture and sound" indicator on the control console, and at the same time sound the buzzer in the Operating Box which will cease only when a "Sound and Picture Checked" push button is manually depressed.

This will cause "Check Picture and Sound" indicator to extinguish, and a "Picture and Sound Checked" indicator to illuminate on the control console, and also a parallelled indicator in the Manager's office.

(5A) Switch on the Secondary Lighting rectifier, also switch on the Secondary Lighting and illuminate a "Secondary Lights ON" indicator and a "Secondary Charger ON" indicator sited on the control console.

(6) To switch on the Neon Signs, also illuminate a "Neon Signs ON" indicator sited on the control console.

(7) To feed the A.C. mains supply to the automaticket equipment, also illuminate the "Cash Desk Mains ON" indicator sited on the Cinemation Console.

(8) Deenergise the contactor holding on the Cleaners Lights and the small power mains.

(8A) Sound Buzzers in the Manager's Office, Male and Female Staff Rooms, the Operating Box, also the Operator's Rest Room.

(8B) Provide the pulse to rotate a Master Drum to the opening line; this function will be described in detail hereinafter.

(8C) Check via a series circuit, that all the chains and padlocks are hanging on the Auto Check Board in the Manager's Office, also illuminate the "Door Chains Checked" indicator sited on the Cinemation Console. This is the stage at which the cinema is timed to open to the Public, and the control console will continue in operation and will proceed to perform the following functions:

(9) Provide the pulse to step the Master Drum to the second line, pinned to lower the Houselights and start the selected Projector etc.

The presentation of both picture and sound now commences.

(10) Deenergise the contactor holding on the Extract Van Motor, also extinguish the "Extract Fan ON" indicator sited on the Cinemation Console.

(11) Energise the contactor to start Extract Motor, also illuminate/Extract Fan ON" indicator sited on the control console.

(12) Energise the contactor to switch on the External Lighting, also illuminate "External Lighting ON" indicator sited on the Cinemation Console.

(13) Energise the contactor to start Washer Pump Motor, also illuminate a "Washer Pump Motor ON" indicator sited on the control console.

(14) To switch on the Cleaners Lights, and also the small power mains.

(14A) To switch on the Night Lights.

(15) Switch off the Automaticket equipment, also extinguish the "Cash Desk Mains ON" indicator sited on the Cinemation Console.

(16) Switch off the Extract Fan Motor, also extinguish the "Extract Fan ON" indicator sited on the control console.

(16A) Switch off the Washer Pump Motor, also extinguish the "Washer Pump ON" indicator sited on the Cinemation Console.

(16B) Switch off the Plenum Fan Motor, also extinguish the "Plenum Fan Motor ON" indicator sited on the control console.

(16C) Switch off the Sound and Projection mains supply.

(17) Switch off the External Lighting.

(18) Switch off the Neon Signs, also extinguish the "Neon Signs ON" indicator sited on the control console.

(18A) Switch off the Circulator Pump, also extinguish the "Circulator Pump ON" indicator sited on the Cinemation Console.

(19) Switch the Control Equipment.

Functions with identical numbers, but followed by a different letter occur at the same point of time.

The master drum control unit is, as described before, brought into action on steps 8 and 9 of the theatre time sequence control unit and it comprises a pair of coaxial drums 12 and 13 which can be rotated stepwise in synchronism by a suitable electric motor operated in response to pulses fed into the master drum control unit. The drum 12 is a master drum and the drum 13 an auxiliary drum. The surfaces of the drums 12 and 13 are perforated as indicated at 14 and each of these perforations can receive a pin 15, the head of which projects beyond the surface of the drum. A number of microswitches 16 are associated with each drum so that each switch 16 can be tripped when a pin 15 in line with the switch is brought past the switch by rotation of the drum.

At step 8 the drums 12 and 13 are rotated through one step by a pulse derived from a relay which is a modified form of the mechanical latching relays 10. This relay is modified so that instead of switching from one static condition to another static condition it merely emits a pulse which is utilised to rotate the drums 12 and 13 through one step. At step 8 the pins 15 on the drum 12 are so positioned that they will open switches for establishing the selected lens, mask plate, masking and curtain position, raise the house lights, raise the pageant spots, start the tape deck for sound reproduction.

The second pulse (step 9) is also derived from a modified mechanical latching relay, and on the movement of the drums 12 and 13 to this second position, the pins 15 on the drum 12 operate the switch controls which lower the house lights and commence projection of the film. After these two steps the drums 12 and 13 remain under the control of the projected film. This is achieved by providing the films being projected with reference marks or spots which are sensed by suitable means during the projection of the film, such means including a photo transistor 17 which delete a foil mark on the film and generally being known as a "pick-of device." As each mark on the film is sensed a pulse is imparted to the master drum control unit through a pulsed relay unit 18 and the drums 12 and 13 rotate through a step, thus bringing a fresh series of pins 15 into engagement with the microswitches 16 and initiating a fresh series of switching operations.

In a typical cinema the master drum control unit carries out the following sequence of switching operations.

(1) Motor and Arc, Left and Right Projector.
(2) Dowser. Picture and Sound changeover Left and Right Projector.
(3) Lens and Aperture Change to First Picture Ratio.
(4) Masking set to First Picture Ratio.
(5) Lens and Aperture Change set to Second Picture Ratio.
(6) Masking set to Second Picture Ratio.
(7) Lens and Aperture Change set to Third Picture Ratio.
(8) Masking set to Third Picture Ratio.

The function of Lens and Aperture Changes is divorced from the masking control, since for special effects it may be required to project a picture of a given ratio and to then arrange for the masking to be adjusted to that picture ratio subsequent to projecting the picture on the screen.

(9) Pulse Auxiliary Drum.
(10) Pageant Spots ON (Remove pin for OFF).
(11) Decorative Lighting ON. (Remove pin for OFF.)
(12) Auto ON.
(13) Master Drum on Self Pulse.
(14) Energise first Lighting circuit in Programme Indicator in Vestibule Foyer/Start Tape Deck for announcements.
(15) Energise second Lighting circuit in Programme Indicator in Vestibule Foyer/Start Tape Deck for announcements.
(16) Energise third Lighting circuit in Programme Indicator in Vestibule Foyer/Start Tape Deck for announcements.
(17) Energise change of House Warning Buzzer in the Manager's Office, the Staff Rooms and the Cash Desk.
(18) Non-synchronous Motor and/or Tape Deck Motor ON.
(19) Tabs OPEN.
(20) Tabs CLOSE.
(21) Non-synchronous Fade Out of Sound.
(22) Film Sound ON.
(23) Non-synchronous Sound ON. Fade in of Sound.
(24) Sales Spot ON (Remove pin for OFF).
(25) Sound Buzzer in Sales Kiosk/Refrigerator Room.
(26) Spare.

It is of course necessary to make the drums 12 and 13 self-pulsing for certain periods as when the film is stationary no information will come to the drums 12 and 13 from the pick-off device.

It is also desirable that all the switching functions automatically performed by the theatre time sequence control unit and the master drum control unit can be performed manually. Thus each switch circuit has associated with it a three position switch 19 which in one position by-passes the time clock and thus provides simple manual control, which in a second position is completely off and breaks the switch circuit completely, and which in its third position cuts in the time clock.

During a normal week of film presentation a cinema will have the same programme sequence and timing on weekdays and Saturday. However, it is usual to alter the programme schedule on Sunday. This could be allowed for by suitably altering the positions of the vanes on the dial 4 of the time clock 3. In order to avoid this constant alteration the control console is provided with a further time clock 20 which is identical to the main time clock 3 and which is programmed to perform the Sunday switching sequence. This time clock 20 is brought into action as follows: A small seven lobe rotor 21 (FIGURE 4) is mounted on the control panel 2 adjacent to the microswitch 7. Each lobe of the rotor 21 has an aperture which can receive a pin 22. The rotor 20 is rotated through a ⅐ of a complete rotation each day by being engaged by a fixed vane 23 carried on the dial 4 so that each lobe is brought in turn into a position close to one arm of the microswitch 7. Normally this would have no effect on the operation of the microswitch 7. However, if the lobe of the rotor 21 is carrying a pin 22 the arrangement is such that the pin 22 lies in the path of the arm of the microswitch 7 and accordingly prevents it from carrying out its switching function. Thus if there is only one pin 22 carried by the rotor 21 the main time clock 3 will be put out of action one day in seven, and this day can be arranged to be Sunday. The time clock 20 has an identical rotor 21 associated with it but in this case the rotor 21 will be arranged to inhibit the action of the time clock 20 on every day of the week except Sunday. The amount of time allocated to either the time clock 3 or the time clock 20 can be varied at will by suitably arranging the pins 22 in the rotor 21.

It should be realised that although the control console hereinbefore described is particularly suited to controlling the operation of a cinema it could be used for other purposes, for example, it might be used in a hotel to control the lighting, heating, ventilation, waking hotel residents, and acting as a warning system for the hotel staff. In such a case the master drum control unit might be replaced by a date logging device which could give to the hotel staff an indication of which rooms were taken and which rooms would become vacant in the near future. By suitably programming the device it could also provide a multitude of other control operations in which it is necessary to have a predetermined switching sequence.

The control console described here and before is simple to operate and can afford a great saving in expense as it can reduce the number of staff needed, for example, to run a large cinema.

We claim:

1. Control equipment comprising a plurality of latching relays each determining whether a different function takes place depending on which of its ON and OFF coils was last energised, a time clock for performing a switching action at predetermined intervals of time to provide a predetermined sequence of such switching actions, a multi-position stepping relay responsive to successive said switching actions to advance successively through its possible positions, each such position causing energisation of at least one of the latching relay coils.

2. Control equipment as claimed in claim 1, in which said time clock comprises a dial rotated by a synchonous motor, the dial having a number of projections each adapted to engage a micro-switch, so as to operate the micro-switch in a sequence predetermined by the spacing of the projections on the dial.

3. Control equipment as claimed in claim 2, in which the position of the projections on the dial are adjustable.

4. Control equipment as claimed in claim 3, in which said projections comprise vanes located in slots in the periphery of the dial.

5. Control equipment as claimed in claim 1, further comprising a control unit actuated by at least one of said latching relays, said control unit being responsive to demand pulses external of said time clock to advance through a sequence of switching function combinations in response to succesive said demand pulses.

6. Control equipment as claimed in claim 5, in which said control unit consists of at least one drum, means for rotating the drum stepwise in response to each said demand pulse, and means on the drum for actuating at least one micro-switch upon each rotation of the drum.

7. Control equipment as claimed in claim 6, in which the surface of said drum is perforated, each perforation being capable of receiving a pin so that the head of the pin can project beyond the surface of the drum; the or each switch so mounted in the drum surface being adapted to operate a micro-switch, so that the switching functions controlled by the drum are dependent upon the arrangement of the pin or pins in the surface of the drum in rows.

8. Control equipment as claimed in claim 5 and including a second time clock set to perform a series of switching actions in a schedule which is different from the first time clock, and further including stop means for rendering one of the time clocks ineffective and bringing the other time clock into operation in a predetermined sequence.

9. Control equipment as claimed in claim 8, in which said stop means include a pair of rotary members, one being associated with each time cock, and means for synchronously rotating the rotary members, each rotary member being arranged to inhibit the switching functions of the associated time clock when it is in predetermined annular position.

10. Control equipment as claimed in claim 9, in which each rotary member is a multi-lobe rotor, each lobe being capable of carrying a projection for engaging the switch operated by the time clock associated with the rotor so as to prevent operation of the switch.

11. Control equipment as claimed in claim 8, further comprising a second control unit arranged with respect to the second time clock in similar manner to said first control unit and the first time clock.

References Cited

UNITED STATES PATENTS

| | | | |
|---|---|---|---|
| 2,062,915 | 12/1936 | Lamb | 307—41 X |
| 2,653,200 | 9/1953 | Foster et al. | 307—41 X |
| 2,881,832 | 4/1959 | Leonard | 307—41 |
| 3,205,368 | 9/1965 | Mirucle | 307—41 X |
| 3,309,543 | 3/1967 | Alston et al. | 307—41 X |

ROBERT K. SCHAEFER, Primary Examiner

H. J. HOHAUSER, Assistant Examiner

U.S. Cl. X.R.

307—132; 317—139